(12) United States Patent
Carruthers

(10) Patent No.: US 8,838,800 B2
(45) Date of Patent: Sep. 16, 2014

(54) BINDING RESOURCES IN A SHARED COMPUTING ENVIRONMENT

(75) Inventor: Kevin Carruthers, Philadelphia, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 232 days.

(21) Appl. No.: 13/386,140

(22) PCT Filed: Nov. 23, 2009

(86) PCT No.: PCT/US2009/065523
§ 371 (c)(1),
(2), (4) Date: Jan. 20, 2012

(87) PCT Pub. No.: WO2011/062596
PCT Pub. Date: May 26, 2011

(65) Prior Publication Data
US 2012/0117247 A1 May 10, 2012

(51) Int. Cl.
*G06F 15/173* (2006.01)
*G06F 21/31* (2013.01)
*G06F 15/177* (2006.01)
*G06F 3/12* (2006.01)

(52) U.S. Cl.
CPC ................................. *G06F 21/31* (2013.01)
USPC ........................ 709/226; 709/220; 358/1.15

(58) Field of Classification Search
None
See application file for complete search history.

(56) References Cited

U.S. PATENT DOCUMENTS

| 5,559,876 | A  | * | 9/1996  | Alperovich ............... 379/205.01 |
| 6,314,435 | B1 |   | 11/2001 | Wollrath et al. |
| 6,330,321 | B2 | * | 12/2001 | Detampel et al. ........ 379/205.01 |
| 6,950,939 | B2 | * | 9/2005  | Tobin ............................ 713/182 |
| 7,171,478 | B2 | * | 1/2007  | Lueckhoff et al. ............ 709/227 |
| 7,529,823 | B2 | * | 5/2009  | Trufinescu et al. ........... 709/223 |
| 7,606,880 | B2 | * | 10/2009 | Shima .......................... 709/220 |
| 2001/0032335 | A1 | * | 10/2001 | Jones ........................... 725/105 |
| 2002/0053032 | A1 |   | 5/2002  | Dowling |
| 2002/0087665 | A1 | * | 7/2002  | Marshall et al. .............. 709/220 |
| 2004/0107245 | A1 |   | 6/2004  | Bodnar |
| 2005/0091343 | A1 |   | 4/2005  | Murray |
| 2005/0213580 | A1 | * | 9/2005  | Mayer et al. ................ 370/395.2 |
| 2006/0031509 | A1 |   | 2/2006  | Ballette et al. |
| 2006/0053216 | A1 |   | 3/2006  | Deokar |
| 2006/0221391 | A1 | * | 10/2006 | Okazawa et al. ............ 358/1.15 |
| 2009/0144197 | A1 | * | 6/2009  | Hurry ............................. 705/41 |
| 2010/0251352 | A1 | * | 9/2010  | Zarchy et al. .................... 726/9 |
| 2013/0070757 | A1 | * | 3/2013  | Elliott et al. .................. 370/352 |

FOREIGN PATENT DOCUMENTS

WO    WO-2009095069    8/2009

OTHER PUBLICATIONS

Wikipedia, "Computer Telephony Integration", Oct. 27, 2009.*
European Patent Office. European Search Report Application No. 09851542.2-1957 / 2504772 PCT/US2009065523, Mail Date Jul. 2, 2013.
International Searching Authority, International Search Report and Written Opinion, Sep. 3, 2010, 12 pages.

* cited by examiner

*Primary Examiner* — Wen-Tai Lin

(57) ABSTRACT

An arbitrator associated with a shared-computing environment registers a first resource based on the resource's identifier. The arbitrator receives the same identifier (for the first resource) from a second resource which is already bound to a user session. Both the first resource and the second resource have independent connections to the shared-computing environment. The arbitrator, having received the identifier for the first resource from the second resource, then binds the first resource to the user session.

11 Claims, 4 Drawing Sheets

BINDING RESOURCES IN A SHARED COMPUTING ENVIRONMENT

BACKGROUND

In shared-computing environments, it can be difficult to determine ownership or association of resources with an individual user when new resources are added to the environment. This is particularly true of physical resources as they interact with a computing environment that is shared by multiple users, even when the environment is logically partitioned between the users (e.g., via separate user accounts). This is also true in cases where a single computing environment is shared by multiple users (e.g., on the same user account).

BRIEF DESCRIPTION OF DRAWINGS

The following description includes discussion of figures having illustrations given by way of example of implementations of embodiments of the invention.

DETAILED DESCRIPTION

Figure 1:
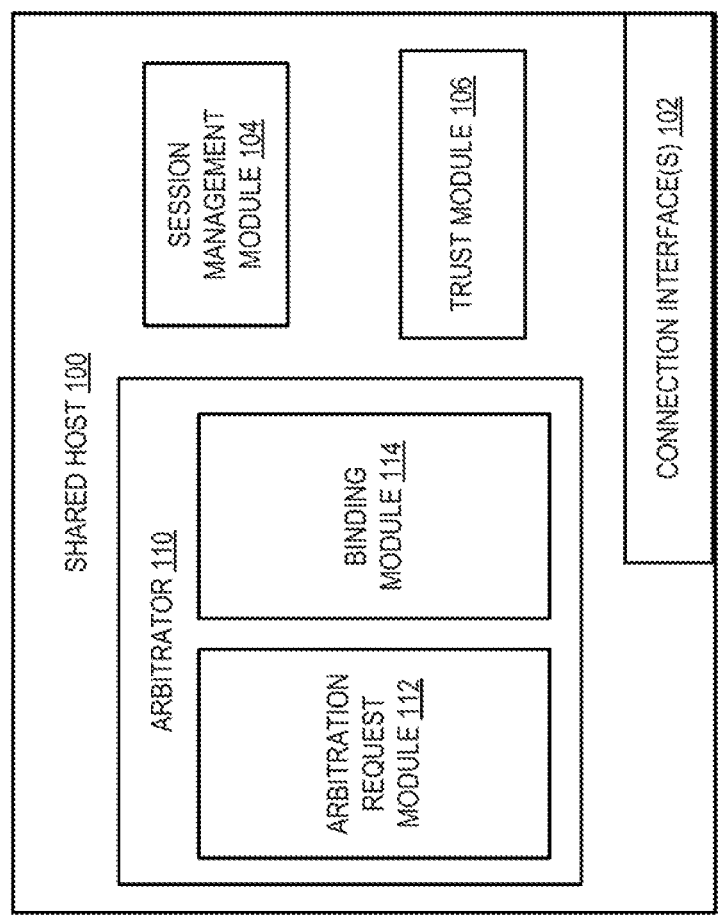
FIG. 1 is a block diagram illustrating a system according to various embodiments.

As provided herein, various methods, systems, an apparatuses enable associations between specific computing resources and specific users in shared-computing environments. Additionally, resources may be added to a user's session without needing to physically bundle the resources or manually configure the resources to be bundled with the host (e.g., server, shared PC) environment. As used herein, the term "resource" refers to a physical, device (e.g., a keyboard, mouse, printer, etc.), a logical service (e.g., a web service) or any other entity that is capable of participating in a discovery, association, and/or binding process within a shared-computing environment.

Embodiments described herein make use of existing communication links with a common trusted authority (e.g., a host, a server, etc.), which coordinates resources and/or arbitrates binding requests between resources. As described herein, a resource may use any communication protocol to communicate with the common trusted authority. In other words, resources may use different protocols and/or methods to individually communicate with the common trusted authority.

In various embodiments, communication between resources is sufficient to allow one resource to communicate a unique identifier to another resource.

One way of linking multiple resources in a shared-computing environment involves tunneling information through an access device. An access device, as used herein, refers to a resource that is used to access a computing environment such as a shared-computing environment. Thus, an access device could be a keyboard, a mouse, a touch display panel or other device that communicates input from a user to the computing environment to which it is connected. Access devices may have an existing (implicit or explicit) trust relationship with a user and/or user session.

To tunnel information from a resource, an access device implements a communication/security relationship with both the common trusted authority (e.g., host, server, etc.) and the resource. In other words, the access device replicates communication capabilities that may already be inherent or available between the common trust authority and the resource. Various embodiments described herein provide the benefits of flexibility and control of association by user-initiated action, but do so without the need for tunneling.

In various embodiments, both the access device (one type of resource) and the other resource each have a trusted connection to a common entity or common trusted authority (e.g., host, server, etc.). Both the access device and the resource can communicate directly with the common entity, but are otherwise not necessarily connected to each other. Examples of an association between an access device and another resource are discussed below.

In various embodiments, the access device is associated with a specific user (e.g., via a user account or session on a host). In other words, the access device has a binding with the specific user account or user session. A communication link is used to convey a unique identifier for the resource to the access device. For example, the unique identifier could be communicated using a direct physical connection between access device and resource, a wireless connection, and/or a separate connection over an existing communication link.

Once the access, device has the unique identifier of the resource, the access device requests the common trusted authority (e.g., host) to associate and/or bind the resource with the user. The common trusted authority subsequently binds the resource with the user account and/or user-session, making the resource private or otherwise owned by the user. Thereafter, subsequent requests to bind to the resource are, denied (assuming the resource is a single-instance resource). The common trusted authority maintains the binding until the resource is freed or released by the user or by a termination of the user-session. In some embodiments, the common trusted authority maintains the binding for a specific period of time. During such a period of time, the binding could be renewed. If the binding is not renewed, the resource could be freed or released upon expiration of the time period.

FIG. 1 is a block diagram illustrating a system according to various embodiments. Shared-host 100 can be any type of computing device that capable of managing a shared-computing environment. Such devices may include, but are not limited to a desktop, workstation, server, notebook, netbook, all-in-one computer, handheld device, etc. As used herein, a shared-computing environment is one in which multiple users can simultaneously utilize shared resources of the computing device (e.g., via separate user-sessions, server-sessions, etc.). It should also be noted that the various described embodiments, a user may refer to a person using the shared-computing environment or it may refer to a logical entity which has a unique meaning within the security context of the host.

Shared-host 100 includes multiple connection interfaces 102 (e.g., ports, communication protocols, etc.), a session management module 104, a trust module 106, and an arbitrator 110. More components/modules or fewer components/modules could be employed in alternate embodiments. The various modules shown in FIG. 1 can be implemented as one or more software modules, hardware modules, special-purpose hardware (e.g., application specific hardware, application specific integrated circuits (ASICs), embedded controllers, hardwired circuitry, etc.), or some combination of these.

Multiple resources (e.g., physical devices, web services, etc.) can each establish a separate trusted connection to shared-host 100 via one or more of the multiple connection interfaces 102. Multi-session management module 104 facilitates and manages multiple simultaneous user sessions on shared-host 100. Trust module 106 facilitates trusted relationships with the various resources using known trust mechanisms (e.g., using a cryptographic protocol, certification authority (CA), public key infrastructure (PKI), or the like). In other words, trust module establishes and/or maintains a separate trust relationship between shared-host 100 and each resource that connects to shared-host 100. A trust relationship could be based simply on having a physical connection in certain embodiments.

Resources may be included in a trust relationship by a separate and unique trust mechanism from other resources. In other words, as long as the trust module can assure a level of trust association between itself and a resource, other resources which may be bound into a common session need be using the same trust mechanism. In some embodiments, trust mechanisms could be rated such that certain resources accept binding to other resources which have a threshold level of trustworthiness.

Arbitrator 110, as shown, includes both an arbitration request module 112 and a binding module 114. Arbitration request module 112 receives an identifier (via one of the multiple connection interfaces 102) for a first trusted resource from a second trusted resource that already has a binding with a user session. For example, a universal serial bus (USB) printer could be connected to shared-host 100 via a USB port while a USB keyboard is also connected to shared-host 100 via a different USB port. In this example, the USB keyboard is an access device and is already bound to a user session (e.g., based on the user session receiving user input directly from the USB keyboard). As described in more detail below, the access device obtains an identifier for the USB printer (e.g., via a temporary physical communication link or wireless communication link such as radio frequency identification (RFID), etc.). The USB keyboard (i.e., the access device) communicates this identifier to arbitration request module 112.

Upon receiving the identifier for the first trusted device (e.g., the USB printer) from the second trusted device (e.g., the USB keyboard), arbitration request module 112 passes the arbitration request to binding module 114 for binding. Binding module 114 then binds the new device—the USB printer in the present example—to the user session. In this way, even though the two resources (e.g., the USB keyboard and printer) may not have a permanent direct connection (either physical or wireless) to each other, they are bundled together as resources belonging to a particular user session. In other words, assuming the newly bound resource (e.g., the USB printer) is a single-instance resource that cannot be shared across multiple user sessions, the binding process prevents any other user associated with a separate user session from using the new resource once it is bound to a single user session.

Figure 2:
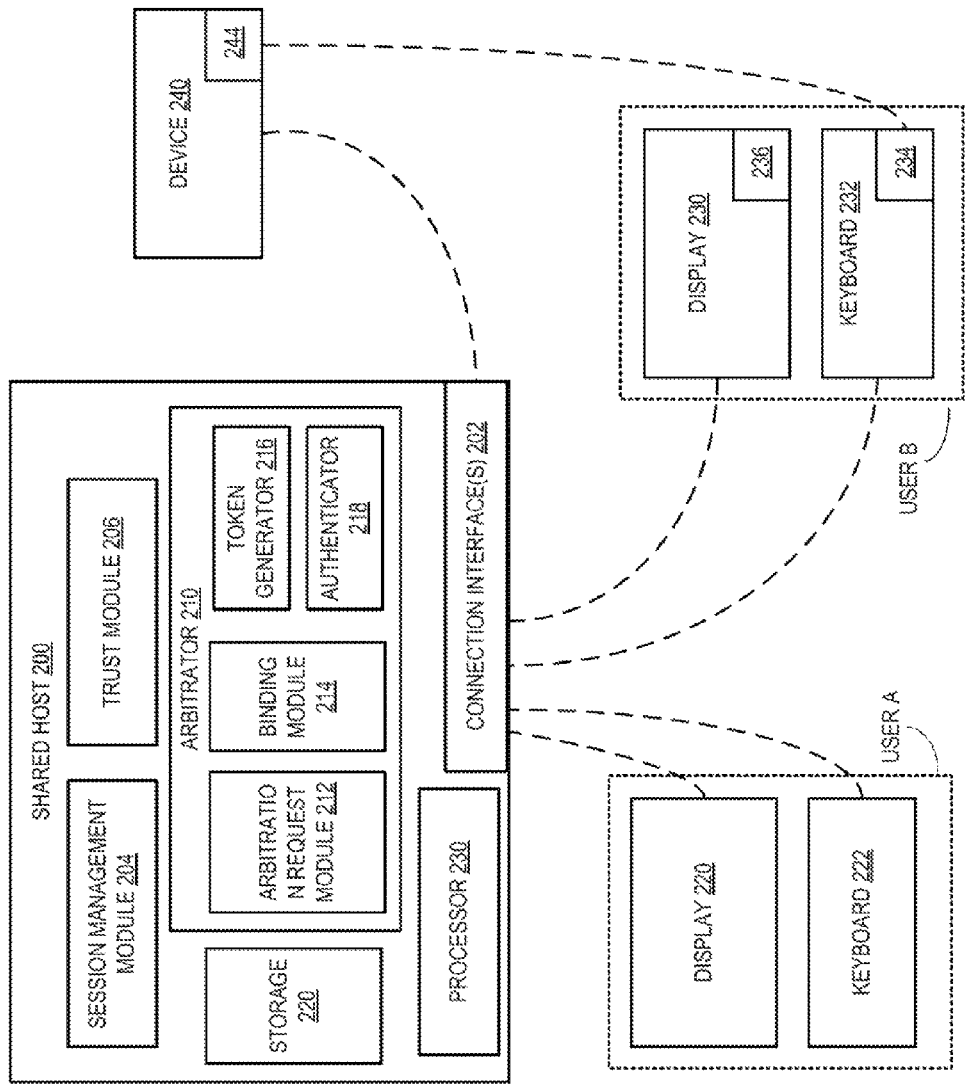
FIG. 2 is a block diagram illustrating a system according to various embodiments.

FIG. 2 is another block diagram illustrating a system according to various embodiments. Similar to shared-host 100 of FIG. 1, shared-host 200 includes a session management module 204, a trust module 206, an arbitrator 210, and communication interface(s) 202. As shown, various external devices are connected to shared-host 200 via separate connection interfaces 202. Displays 220 and 230, keyboards 222 and 232, and device 240 may be USB devices connected to shared-host 200 via separate USB ports in certain embodiments. Other connection types, protocols, interfaces, ports, etc. could be used in different embodiments.

In the following example, display 220 and keyboard 222 are associated (e.g., by a binding to a user session) with a first user (user A) while display 230 and keyboard 232 are associated (e.g., by a binding to a different user session) with a second user (user B). In other words, both the user A and user B are simultaneously availing themselves of the shared-computing environment on shared-host 200. Thus, both users are, for example, able to use various applications, browse web content, load and store data, etc. using the shared-computing environment. While shared computing is known in the art, previous techniques for allocating resources in a shared computing environment have mostly been limited to manual configuration by a system administrator. In various embodiments, including those illustrated by the example in FIG. 2, resources are allocated without the need for prior art manual configuration.

When device 240 is first connected to shared-host 200, there is an initial question regarding which, if any, of the two aforementioned users (A or B) will have access to this resource. (It will be assumed for purposes of this example discussion that device 240 is a single-user device, meaning that device 240 may be bound to a single user at a time rather than be shared simultaneously among multiple users. Alternate embodiments may be implemented using shared-user resources).

In various embodiments, resources connected to shared-host 200 have a separate connection point for communicating directly with each other. For example, keyboard 232 includes connection point 234 and device 240 includes connection point 244. These connection points are capable of communicating and/or receiving a resource identifier from another resource. Thus, a connection point could be a physical connection point (e.g., to facilitate a wire-cable connection of some kind) or it could be a wireless connection point (e.g., Bluetooth®, RFID, etc.). Accordingly, if user B wishes to bundle device 240 into user B's session (or if device 240 is merely detected based on, for example, proximity to keyboard 232), connection points 234 or 236 can be used to exchange one or more resource identifiers with device 240 via connection point 244. The resource identifier can be any type of identifier that shared-host 200 will recognize as identifying a resource connected to shared-host 200.

Continuing with the example in FIG. 2, when keyboard 232 obtains a resource identifier for device 240 (e.g., via its connection point 234), keyboard 232 communicates resource identifier to arbitrator 210. Arbitration request module receives the identifier for device 240 from keyboard 232. Given that keyboard 232 and device 240 each have a separate trusted connection with shared-host 200 (established via trust module 206), arbitration request module interprets the receipt of the identifier as a request to have device 240 bound to user B.

In some embodiments, arbitration request module 212 passes the binding request directly to binding module 214 which binds device 240 to user B's session based on the request. In other embodiments, arbitration request module 212 forwards the binding request to token generator 216. Token generator 216 generates a token that is sent to device 240. In certain embodiments, arbitrator 210 may notify keyboard 232 and/or display 230 (which are both already bound to user B's session) that a token has been generated and sent to device 240. Device 240 forwards the token to keyboard 232 and/or display 230 either automatically or by request from keyboard 232 and/or display 230. Display 230 and/or keyboard 232 then communicates the token back to authenticator 218, closing the authentication loop. If the token received by authenticator 218 matches the token sent to device 240, then the original arbitration request is authenticated and device 240 is bound to user B's session.

The authentication process described above could be useful, for example, to facilitate a bank ATM transaction using a mobile device. If both the mobile device and the ATM have separate trusted connections with the bank, then the mobile device could be used to generate an ATM request and the token could be used to securely close the loop, thus reducing the risk of fraud. In alternate embodiments, other forms of authentication could be used.

Figure 3:
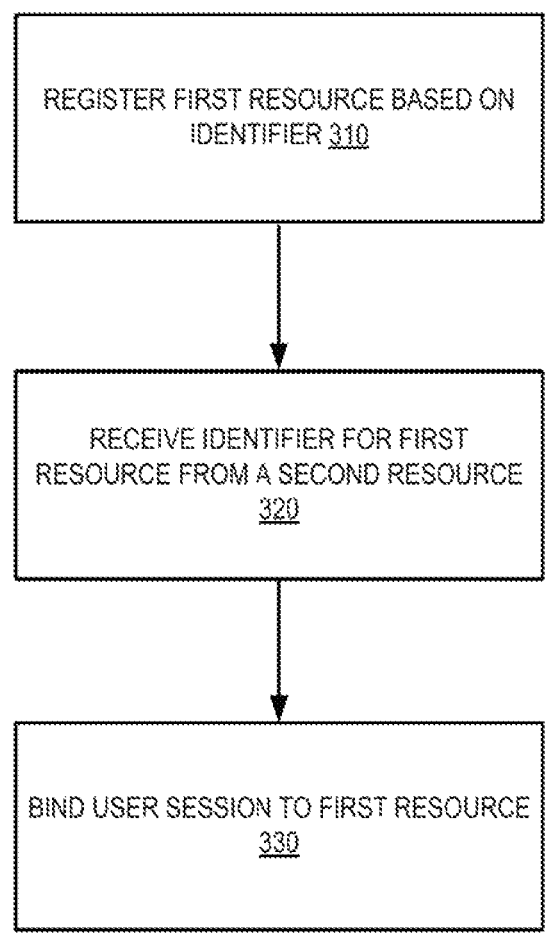
FIG. 3 is a flow diagram of operation in a system according to various embodiments.

FIG. 3 is a flow diagram of operation for a system according to various embodiments. A shared-computing system registers 310 a first resource based on an identifier associated with the first resource. A resource identifier can be any type of identifier that distinguishes a resource from other resources (e.g., serial number, RFID tag, custom ID, etc.). The shared-computing system subsequently receives 320 the resource identifier for the first resource from a second, resource that already has a binding to a user and/or a user session. In various embodiments, the binding signifies that the second resource is also registered with the registering entity (e.g., shared-host, shared-server, etc.). The receipt of the first resource identifier from the second resource is interpreted as a request to create a relationship between the two resources. Thus, in response to receiving the identifier, the first resource is also bound 330 to the user and/or user session. In this way, two resources that may only have a temporary communication link with each other may be bound to each other or to a larger bundle of resources without the need for private tunneling mechanisms or duplication of hardware resources.

In some embodiments, a request to create a relationship between two resources may be presented to a user, who may accept or reject the binding request.

Figure 4:
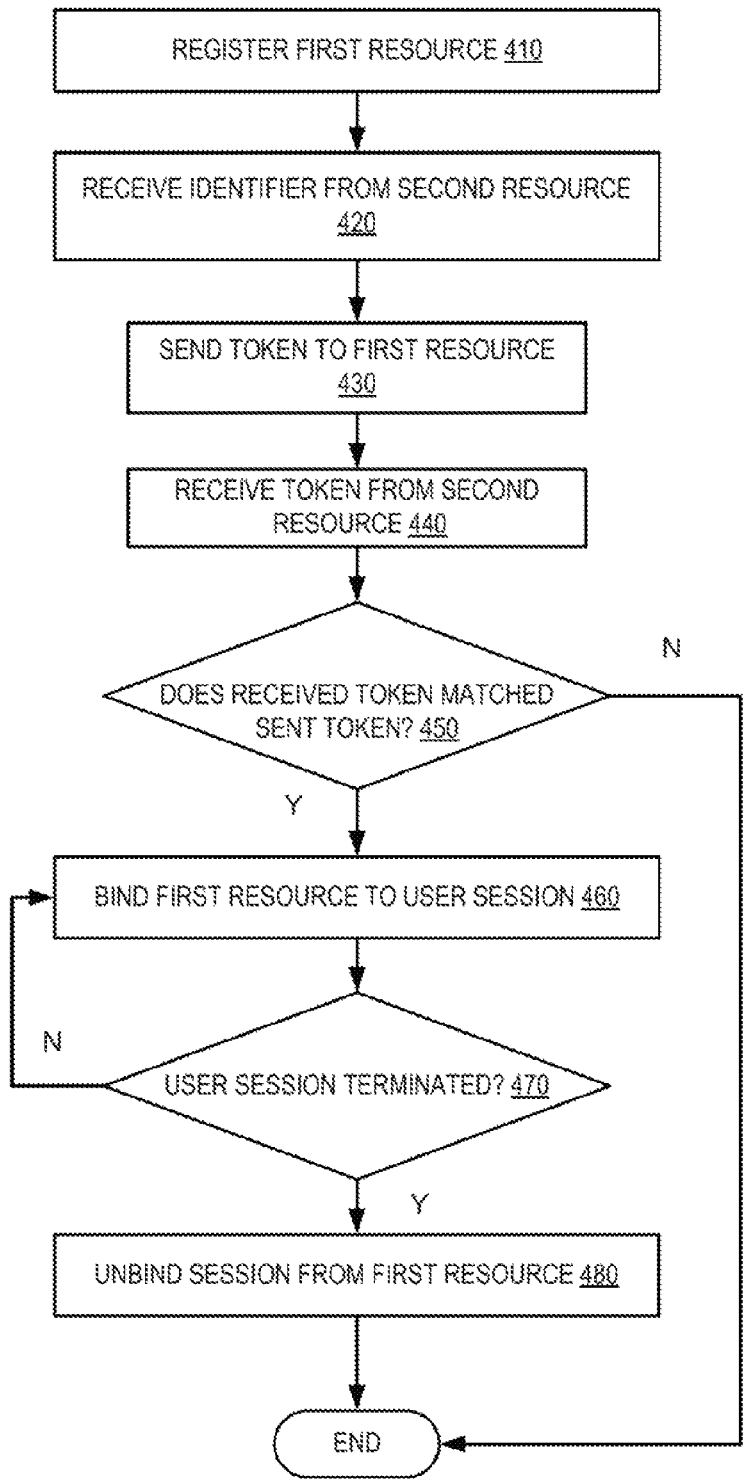
FIG. 4 is a flow diagram of operation in a system according to various embodiments.

FIG. 4 is another flow diagram of operation in a system according to various embodiments. The steps described are not intended to be limiting. More steps, fewer steps and/or different steps could be used in alternate embodiments. Furthermore, the described steps can be performed in a different order in certain embodiments.

An arbitrator registers 410 a first resource. The arbitrator may be part of a shared-computing environment and can be implemented as software, hardware, special-purpose hardware, an embedded controller, hardwired circuitry, or some combination of these and/or similar elements. The registration by the arbitrator may involve establishing a trusted relationship between the shared-computing environment and the resource. The registration may include logging the identity of the resource for the purpose of communicating with the resource.

The arbitrator receives 420 an identifier for the first resource from a second resource. The identifier can be any type of identifier, including, but not limited to, a serial number of a device, an RFID tag, a process ID, a custom tag or ID, etc. As an example, the first resource might be a printer and the second resource might be a keyboard. As discussed previously, each resource has a separate (physical or wireless) connection to the shared-computing environment. Thus, the keyboard might communicate the printer's identifier to the shared-computing environment. To communicate the identifier, one resource obtains the identifier from the other resource. The identifier could be obtained by a separate and direct connection (physical and/or wireless) between the two resources or via a separate connection over an existing communication link.

The receipt of an identifier for one trusted resource from another trusted resource (e.g., receiving a printer's identifier from a keyboard) may be treated as a request to bind the two resources together or to a common user and/or user session.

Thus, in response to receiving the identifier, the shared-computing environment sends 440 a token to one of the resources. The token is, in effect, an acknowledgement of the arbitration request and seeks to confirm the parties involved. The shared-computing environment subsequently determines 450 whether the token received matches the token sent. In other words, by sending the token to one of the resources, the arbitrator will only confirm the request and proceed to binding, if it receives the same token back from the other resource. In alternate embodiments, the token could be sent from one of the two resources (i.e., instead of the shared-computing environment) and the token would similarly be authenticated by passing the token between the resources and the shared-computing environment until a full loop is completed. Other forms of secure authentication could be used in different embodiments.

In various embodiments, if the shared-computing environment determines that the received token does not match the sent token, then the arbitration process ends and no binding occurs. If, on the other hand, the received token matches the sent token, the shared-computing environment binds 360 the first resource to the user and/or user session. The shared-computing environment subsequently monitors the status of the user session and determines 470 whether the user session has terminated. If the user session still exists and/or remains active, then the shared-computing environment maintains the existing binding. If, however, there is an indication that the user session does not exist or has otherwise been terminated, the shared-computing environment unbinds 480 the first resource from the user session. Once the first resource is unbound, the resource may be bound to a different user and/or user session.

It should be noted that in various embodiments, a resource may be a multi-user resource. For example, a printer might be a shared-printer. In the case of multi-user resources, the systems and methods described herein may still be utilized without detracting from the principles provided herein. For example, arbitration requests and token authentications involving multi-use resources may be processed similar to those of single-user resources. With respect to binding, the act of binding a multi-user resource to one user and/or user session does not prevent a subsequent binding to another user and/or user session. Although, in some embodiments, one resource could request single-user access to a multi-user resource.

Elements of embodiments described may also be provided as a computer-readable storage medium for storing the computer-executable instructions. For example, instructions could be stored on shared host 200 of FIG. 2 in storage 220 and executed by processor 230. Various components described herein may be a means for performing the functions described herein.

The invention claimed is:
1. A method, comprising:
registering, at an arbitrator of a shared-computing environment, a resource based at least in part on an identifier for the resource;
providing, with a processor of a host computing device, the shared computing environment, wherein the processor is utilized simultaneously by a plurality of access devices, each access device being associated with one of a plurality of users registered with the arbitrator;
receiving, by the arbitrator, the identifier for the resource from an access device of the plurality of access devices, the access device being associated with a user during a user session bound to the user, the resource and the access device having independent connections to the shared-computing environment; and sending, from the arbitrator, a first token to the resource in response to receiving the identifier from the access device;

subsequent to sending the first token, receiving a second token from the access device prior to binding the resource to the access device and the user session;

binding, by the arbitrator, the resource to the access device and the user session only if the received second token matches the sent first token, the binding creating a private communication link including the independent connections from the resource and the access device to the shared computing environment such that no other access device associated with another user can communicate with the resource while the resource is bound to the access device and the user session.

2. The method of claim 1, wherein the binding comprises:

providing a notification requesting the user associated with the user session to accept or reject binding to the resource in response to the arbitrator receiving the identifier; and receiving an acceptance from the user;

wherein the arbitrator binds the resource to the access device and the user session in response to receiving the acceptance.

3. The method of claim 1, wherein, prior to the arbitrator receiving the identifier, the resource communicates the identifier directly to the access device over a communication link separate from the independent connections to the shared computing environment.

4. The method of claim 1, wherein the resource and the access device are separately registered with the arbitrator via at least one of a plug-and-play connection, a network connection, or a wireless connection.

5. The method of claim 1, further comprising:

denying a subsequent request from another user session to bind to the resource.

6. The method of claim 1, further comprising:

unbinding the resource in response to one or more of a user request, a termination of the user session, or expiration of a timer.

7. A shared-computing host, comprising:

a processor providing a shared computing environment, wherein the processor is utilized simultaneously by a plurality of access devices during multiple simultaneous user sessions, each access device being associated with one of a plurality of users registered with the shared-computing host multiple connection interfaces to connect with multiple resources and the plurality of access devices;

a multi-session management module to manage the multiple simultaneous user sessions; and an arbitrator, comprising an arbitration request module to receive, via one of the multiple connection interfaces, an identifier for a trusted resource from an access device of the plurality of access devices, the access device being associated with a user to which a user session on the shared-computing host is bound, each of the trusted resources and the plurality of access devices being separately connected via independent connections to the shared-computing host;

a token generator to generate a first token to be sent to the trusted resource in response to receiving the identifier for the trusted resource from the access device;

an authenticator to verify a second token received from the access device matches the first token sent to the trusted resource, wherein the second token is received subsequent to the first token being sent; and a binding module to bind the trusted resource to the access device and the user session only if the second token matches the first token, the binding creating a private communication link including the independent connections such that no other access device associated with another user can communicate with the trusted resource while the trusted resource is bound to the access device and the user session.

8. The shared-computing host of claim 7, the arbitrator further to limit a number of user sessions that may be bound to a particular resource.

9. The shared-computing host of claim 7, the arbitrator further to control at least access-level or priority of a user session for binding to a particular resource.

10. The shared-computing host of claim 7, the binding module further to unbind the user session from the trusted resource in response to one or more of a user request, a termination of the user session, or expiration of a timer.

11. The shared-computing host of claim 7, further comprising:

a trust module to facilitate trusted relationships with one or more resources.

* * * * *